(12) United States Patent
Zeygerman et al.

(10) Patent No.: US 8,227,725 B2
(45) Date of Patent: Jul. 24, 2012

(54) MOVING ENCLOSURES FOR LASER EQUIPMENT

(75) Inventors: Leonid Zeygerman, West Hartford, CT (US); Christian Zimmermann, Burlington, CT (US)

(73) Assignee: Trumpf, Inc., Farmington, CT (US)

( * ) Notice: Subject to any disclaimer, the term of this patent is extended or adjusted under 35 U.S.C. 154(b) by 548 days.

(21) Appl. No.: 12/446,857

(22) PCT Filed: Oct. 24, 2006

(86) PCT No.: PCT/US2006/060188
§ 371 (c)(1),
(2), (4) Date: Nov. 23, 2009

(87) PCT Pub. No.: WO2008/051252
PCT Pub. Date: May 2, 2008

(65) Prior Publication Data
US 2010/0084385 A1 Apr. 8, 2010

(51) Int. Cl.
*B23K 26/14* (2006.01)
(52) U.S. Cl. .................................. 219/121.67
(58) Field of Classification Search ............. 219/121.67, 219/146.52, 147, 159, 385
See application file for complete search history.

(56) References Cited

U.S. PATENT DOCUMENTS

| 4,417,125 | A | * | 11/1983 | Tsutsumi | 219/121.82 |
| 5,614,117 | A | * | 3/1997 | Krobath | 219/147 |
| 5,705,785 | A | * | 1/1998 | Dykhno et al. | 219/121.45 |
| 5,866,870 | A | * | 2/1999 | Walduck | 219/121.45 |
| 7,408,130 | B2 | * | 8/2008 | Sonoda et al. | 219/137 R |
| 2005/0095074 | A1 | | 5/2005 | Hacker et al. | |
| 2005/0199594 | A1 | * | 9/2005 | Baillot | 219/121.48 |

FOREIGN PATENT DOCUMENTS

DE 4436944 4/1996
EP 0 206 080 12/1986

OTHER PUBLICATIONS

International Search Report for Corresponding PCT Application No. PCT/US2006/060188, mailed Feb. 14, 2007, 2 pages.

* cited by examiner

*Primary Examiner* — William D Coleman
(74) *Attorney, Agent, or Firm* — Fish & Richardson P.C.

(57) ABSTRACT

Moving enclosures for laser equipment are provided. A machine tool installation is disclosed including (a) a laser cutting head configured to be movable in three dimensions; (b) a workpiece support configured to support a workpiece in operative relationship with the laser cutting head (c) a skirt configured to surround the laser cutting head on three sides and intercept light that passes from the head and is reflected off of the workpiece or workpiece support; and (d) a protective cover positioned to intercept light that is reflected off of the workpiece or workpiece support and is not intercepted by the skirt. The skirt and protective cover are configured to move laterally with the laser cutting head.

21 Claims, 8 Drawing Sheets

MOVING ENCLOSURES FOR LASER EQUIPMENT

TECHNICAL FIELD

This invention relates to moving enclosures for laser equipment, to protect operators from uncontrolled beam reflection during laser operation.

BACKGROUND

It is important to protect operators working around laser equipment, e.g., equipment for laser cutting of workpieces, from uncontrolled beam reflection during laser operation. Such reflection, which can occur for example while a part that is being cut by a laser is tipped, could injure the operator if it contacts the operator's body. It is also important, however, that the operator have easy access to parts of the equipment that need to be changed or maintained, for example the cutting head, when the laser is not operating.

In some cases, for example as disclosed in U.S. Pat. No. 6,987,241, the equipment may be enclosed in a stationary cabin-like enclosure that is accessed through sliding doors.

SUMMARY

The disclosure features enclosures for laser equipment that are movable and that allow easy access to a cutting head of the laser equipment while providing effective safety protection when the laser is in operation.

In one aspect, the present disclosure features a machine tool installation comprising: (a) a laser cutting head configured to be movable in at least two dimensions; (b) a workpiece support configured to support a workpiece in operative relationship with the laser cutting head; (c) a skirt configured to surround the laser cutting head on three sides and intercept light that passes from the head and is reflected off of the workpiece or workpiece support; and (d) a protective cover positioned to intercept light that is reflected off of the workpiece or workpiece support and is not intercepted by the skirt; the skirt and protective cover being configured to move laterally with the laser cutting head.

Some implementations may include one or more of the following features. The skirt may be configured to move vertically with the cutting head, or alternatively, the skirt may be configured to move vertically independently of the cutting head. In the latter case, the machine tool installation may include a skirt drive motor and a cam arrangement configured to raise and lower the skirt in response to input from the skirt drive motor. The machine tool installation may also include a controller configured to control the vertical height of the skirt, and a height regulation device comprising a sensor configured to detect the vertical position of the workpiece and transmit a signal to the controller.

The skirt may be configured to move horizontally, in a second direction orthogonal to the lateral movement, with the laser cutting head. The skirt may be configured to move within the protective cover, which in some implementations is not configured for movement in the second direction. The skirt may include an array of pins mounted on a substantially U-shaped bracket. The pins may be arranged in a labyrinth, with their long axes extending generally parallel to the direction of light emitted by the laser cutting head.

The protective cover may include a door, and may define open side and back regions. The machine tool installation may also include a motion device configured to move the protective cover and laser cutting head laterally. In some cases, the machine tool installation also includes a support structure from which the protective cover and laser cutting head are cantilevered and along which the protective cover and laser cutting head move laterally. Alternatively, the machine tool installation may include a pair of opposed rails between which the motion device is mounted and along which the motion device, protective cover and laser cutting head move laterally. In the latter case, the protective cover may in some cases be mounted directly on the laser cutting head.

In another aspect, the disclosure features a moving enclosure for a machine tool installation including a laser cutting head configured to be movable in at least two dimensions, the enclosure comprising: (a) a skirt configured to surround the laser cutting head on three sides; (b) a z-axis motion control unit, on which the skirt is mounted, configured to position the skirt vertically relative to a workpiece to be machined; and (c) a protective cover positioned to intercept reflected light from the laser cutting head that is not intercepted by the skirt; the skirt and protective cover being configured to move laterally with the laser cutting head.

The disclosure also features methods of protecting operators of machine tool installations from laser light using the moving enclosures disclosed herein. The details of one or more implementations are set forth in the accompanying drawings and the description below. Other features and advantages of the enclosures disclosed herein will be apparent from the description and drawings, and from the claims.

DETAILED DESCRIPTION

Figure 1:
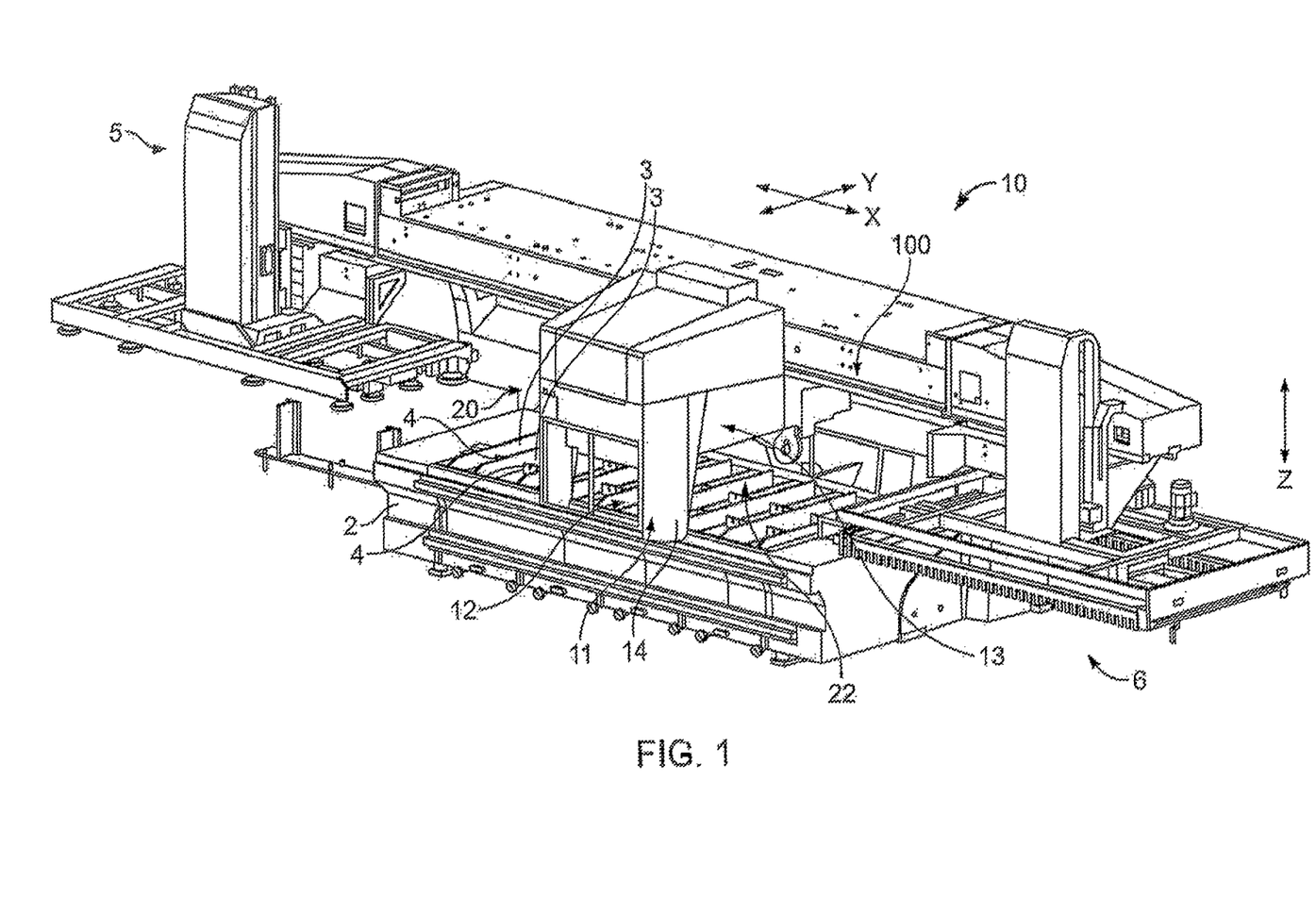
FIG. 1 is a perspective view of a laser machine tool installation including a moving enclosure according to one implementation.
Figure 2:
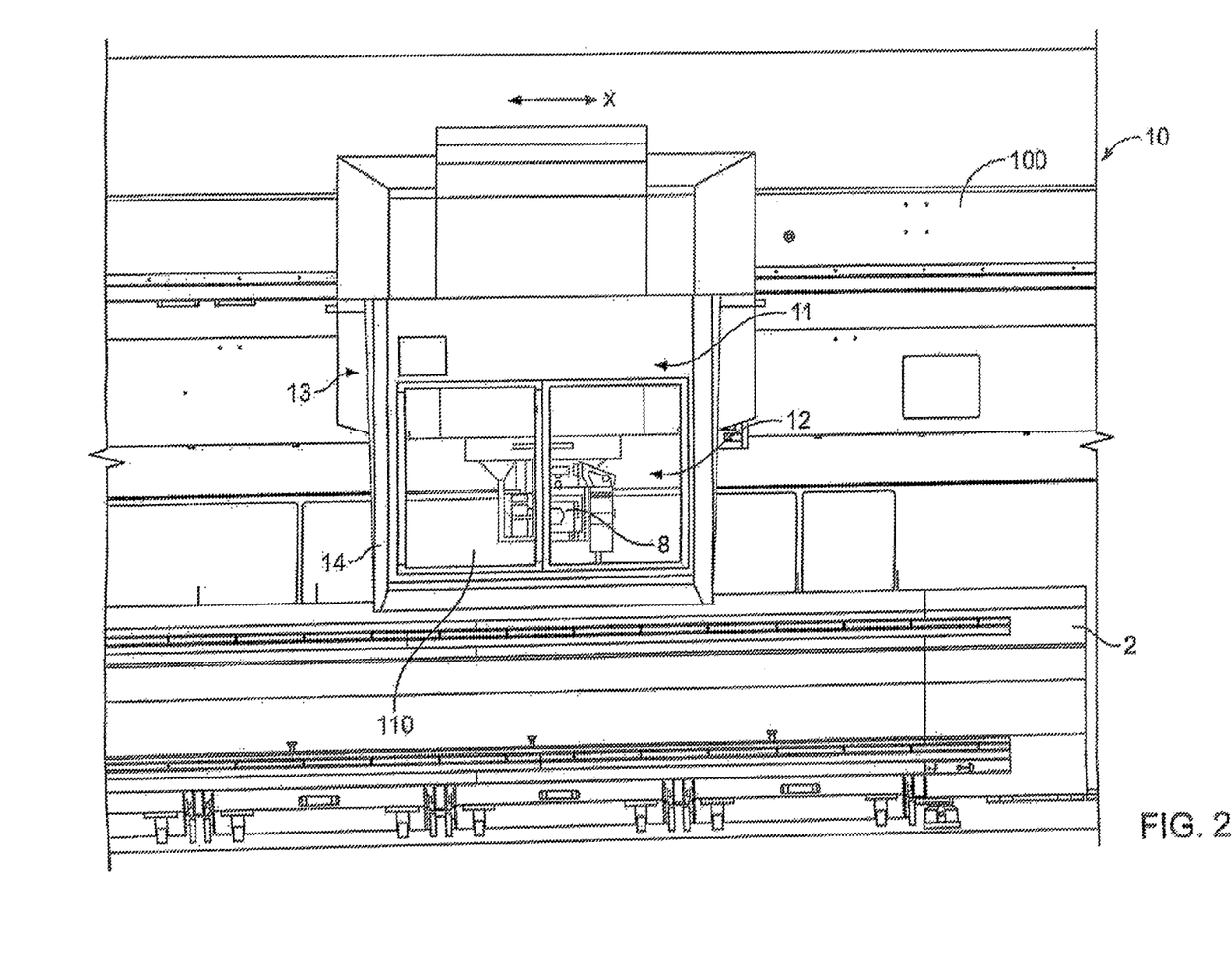
FIG. 2 is a front view of the moving enclosure shown in FIG. 1

Referring to FIG. 1, a laser machine tool installation 10 includes a moving enclosure 11 that surrounds a laser cutting head 8 (FIG. 2), a workpiece bed 2 including a plurality of workpiece supports 3 and sub-supports 4 disposed orthogonal to the supports 3. The workpiece supports 3 are configured to support a workpiece (not shown), e.g., a sheet of metal, beneath the laser cutting head during a cutting operation. The moving enclosure 11 protects the operator from laser light reflected off of the workpiece supports, sub-supports or workpiece, as will be discussed in detail below. The installation 10 also includes material transfer units 5, 6, configured to place the workpiece on the workpiece bed prior to processing and remove it from the bed after processing.

Figure 3:
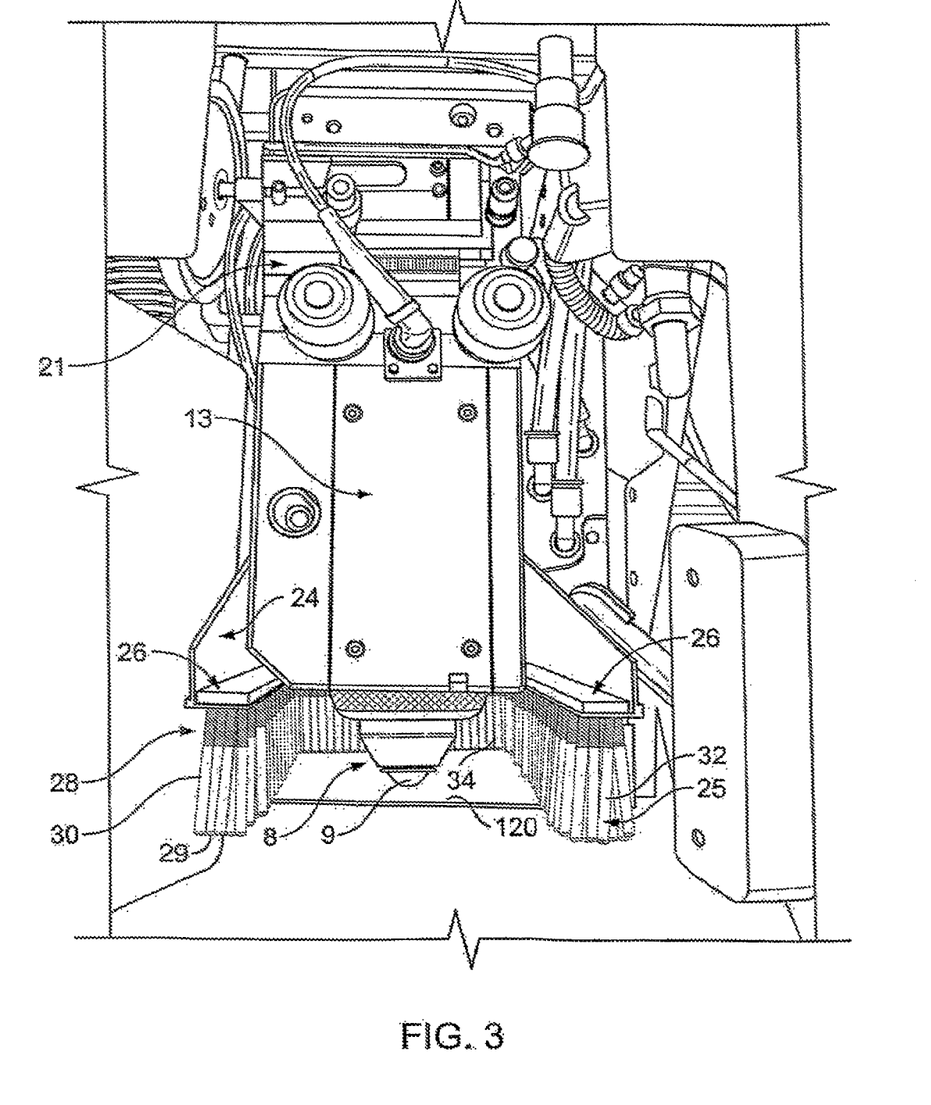
FIGS. 3 and 4 are front and bottom views, respectively, of a skirt portion of the moving enclosure shown in FIG. 1.

The moving enclosure 11 includes a protective cover 14 having a protective door 12, e.g., a bifold door. In the implementation shown in FIG. 1, the laser cutting head 8 and the protective cover 14 are cantilevered out from a rear support surface 100 of the installation 10, and are mounted on a motion unit 13. The motion unit 13 includes a motor (not shown) that moves the laser cutting head horizontally in the x direction. The cutting head moves in the y direction along y-direction guides (not shown), and in the z direction on z-direction guides installed on a z-axis plate 120 (FIG. 3). The laser cutting head moves relative to the protective cover 14 in the y direction (towards and away from the protective door 12), and the z direction (up and down within the protective cover), and with the protective cover in the x direction (laterally). In the x direction, the protective cover and laser cutting head travel along the support surface 100. Motion of the head and cover in the x direction allows the laser cutting head and protective cover to move out of the way during placement and removal of a workpiece by the material transfer units, and allows the cutting head to make cuts in the x direction when it is in operation. Motion of the head in the y direction within the protective cover allows the cutting head to make cuts in the y direction, while motion of the head in the z direction allows the distance between the cutting head and the workpiece to be adjusted, e.g., to compensate for different workpiece thicknesses and/or to utilize different processing techniques.

During cutting, it is important that the operator of the machine tool installation 10 be protected from stray laser light that may reflect off of the workpiece, the workpiece supports 3, or the sub-supports 4. The protective door 12 protects the operator from stray laser beams that are directed towards the front (door side) of the cover 14, while allowing the operator to access the laser cutting head within the enclosure 11, e.g., to change the head.

In order to minimize the weight of the protective cover 14 and allow it to be easily moved in the x direction, and avoid collisions with cut parts, the protective cover 14 is open in regions 20, 22 along its sides and also is open at the back. Thus, a secondary device is needed to protect the operator from reflected laser beams in these areas. To provide this protection, the moving enclosure 11 further includes a skirt 28 (FIGS. 3-4) that surrounds the laser cutting head on three sides 30, 32 and 34, corresponding to the open side and back regions of the protective cover. The skirt 28 is open at the front (front opening 7, FIG. 5), allowing the operator to easily access the laser cutting head 8 when the protective door 12 is open.

Figure 5:
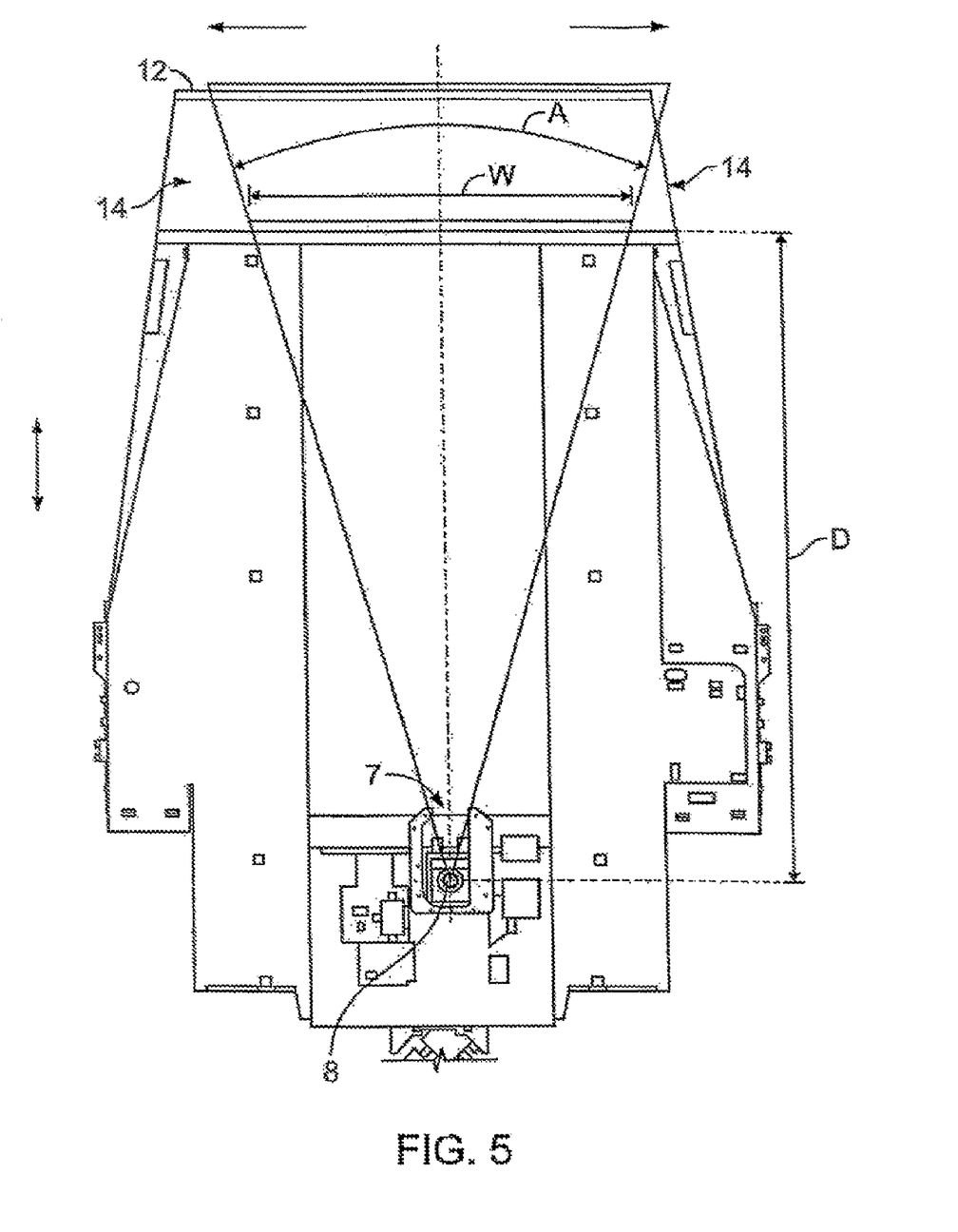
FIG. 5 is a view of the moving enclosure shown in FIG. 1 taken from below.

Referring to FIG. 5, which shows the laser cutting head 8 from the bottom, the skirt 28 is designed so that when the laser cutting head 8 is in its position furthest from the protective door 12 in the y direction, reflected laser light could escape from the open front 7 of the skirt at any point within angle A. The width W of door 12 is preferably selected to cover the entire area into which the reflected laser light exiting from the front of the skirt could escape when the laser cutting head is in the position shown in FIG. 5. For example, if angle A is approximately 30 degrees, and maximum distance D between the door 12 and the laser cutting head 8 is about 1.5 meters, the width W of the door is preferably about 830 mm. Advantageously, since angle A is relative small (e.g., less than 60 degrees and preferably less than 40 degrees), and the maximum distance between the laser head and the door is relatively short (e.g., less than 3 meters), the door 12 can be relatively small. For example, the width W of door 12 may be less than 3 meters, preferably less than 2 meters.

Figure 4:
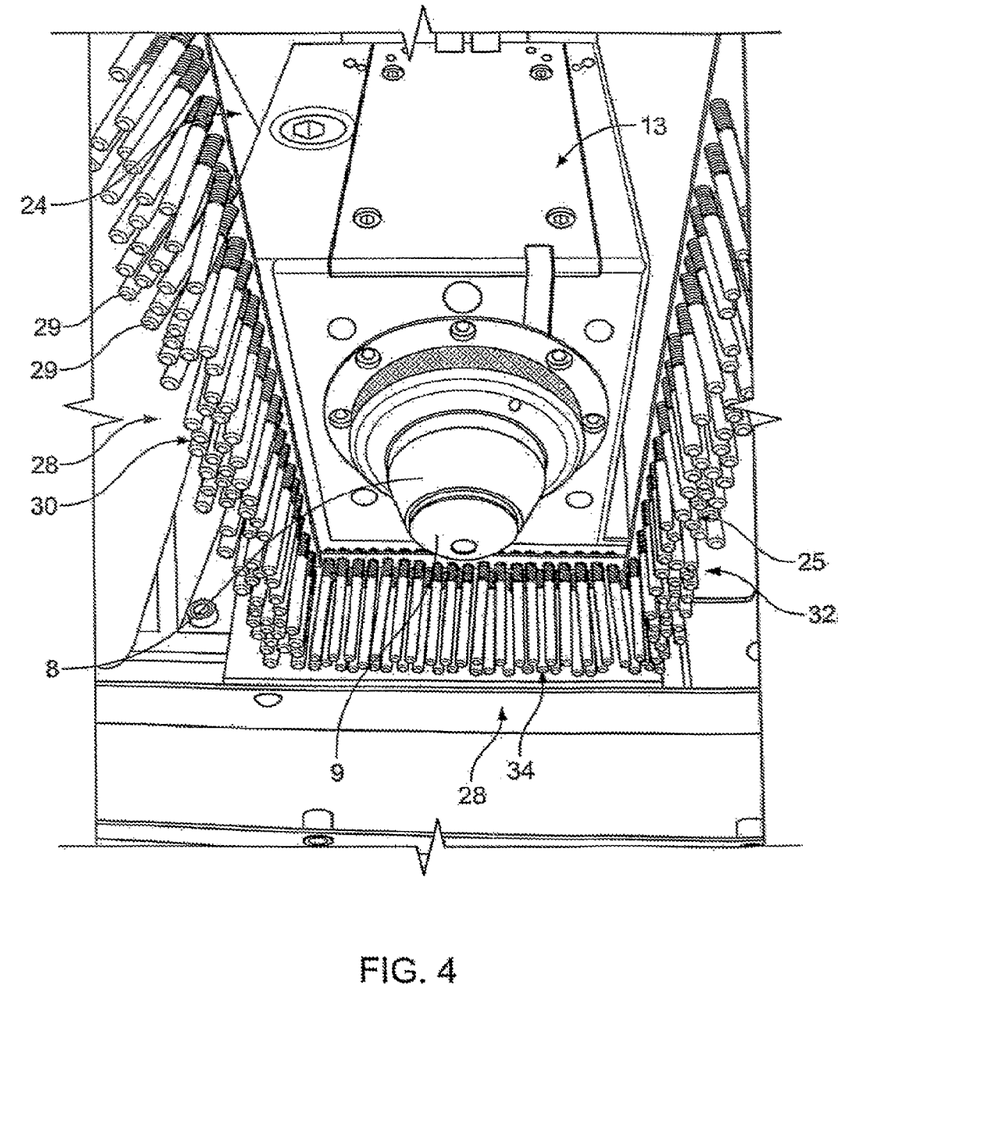
Figure 6:
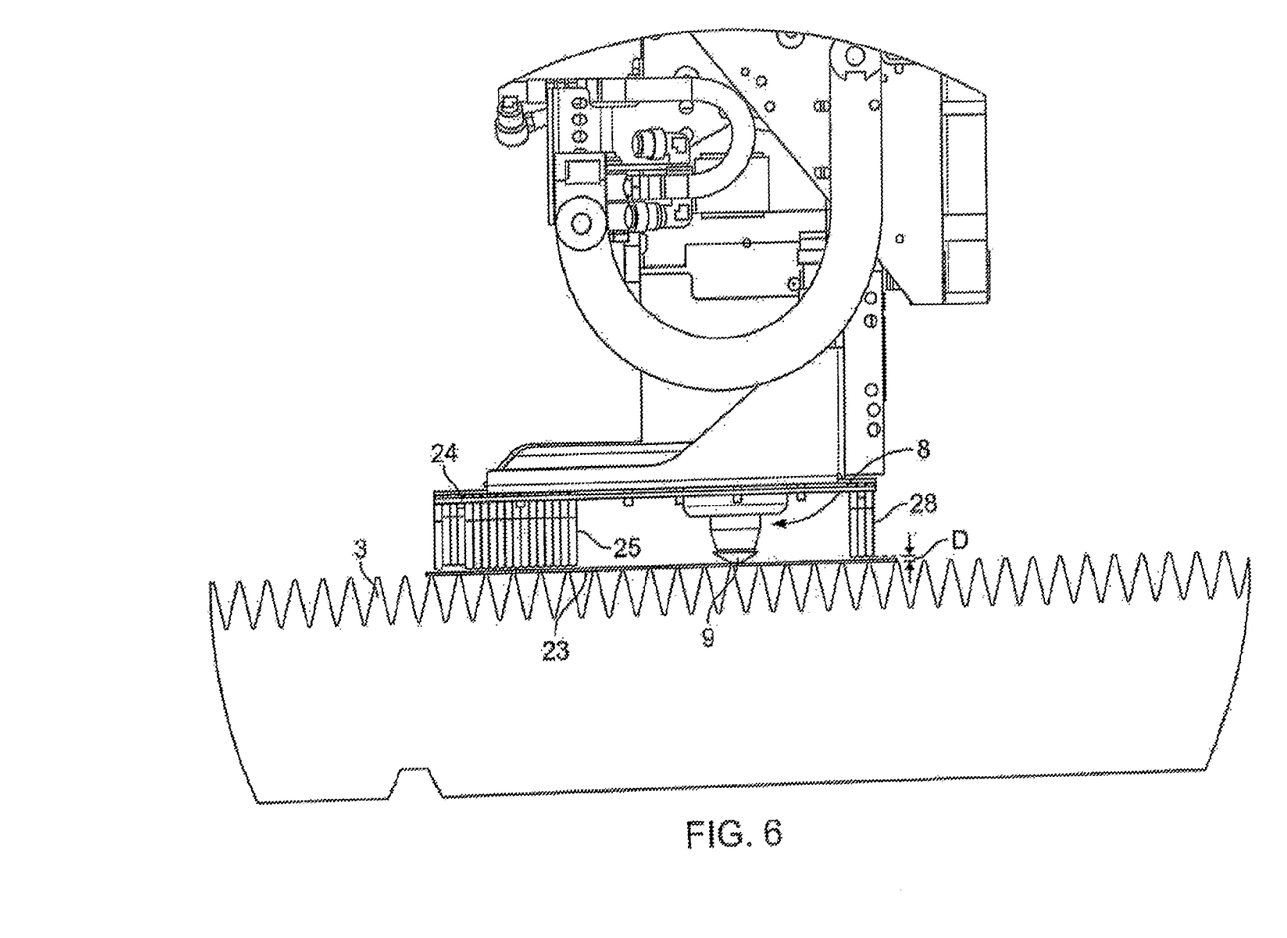
FIG. 6 is a side cross-sectional view of the moving enclosure shown in FIG. 1.

Preferably, the skirt 28 is small relative to the size of the protective cover 14 within which it moves, and closely surrounds the laser cutting head 8. Referring now to FIGS. 3 and 4, the skirt 28 is preferably formed of an array of pins 25 that extends downwardly from side legs 26 of a U-shaped bracket 24. In this implementation, the bases 29 of the pins, which define the bottom of the skirt, are substantially level with the tip of the nozzle 9 of laser cutting head 8. As a result, as shown in FIG. 6, when the nozzle 9 is positioned close to the workpiece 23 during cutting, the bottom of the skirt will also be close to the workpiece. For example, distance D between the bottom of the pins and the upper surface of the workpiece may be less than 5 mm, preferably about 1 to 2 mm.

The pins 25 are arranged to form a labyrinth, i.e., by staggering the rows of pins. This labyrinth arrangement prevents a reflected laser beam (which cannot turn a corner) from passing through the skirt 28. The skirt is positioned relative to the laser nozzle so that the side arms 30, 32 of the skirt protect the operator in side regions 20, 22 (FIG. 1) and the back 34 of the skirt protects the operator at the back of the laser machine tool installation. As discussed above, the operator is protected at the front of the installation by the protective door 12.

Figure 7:
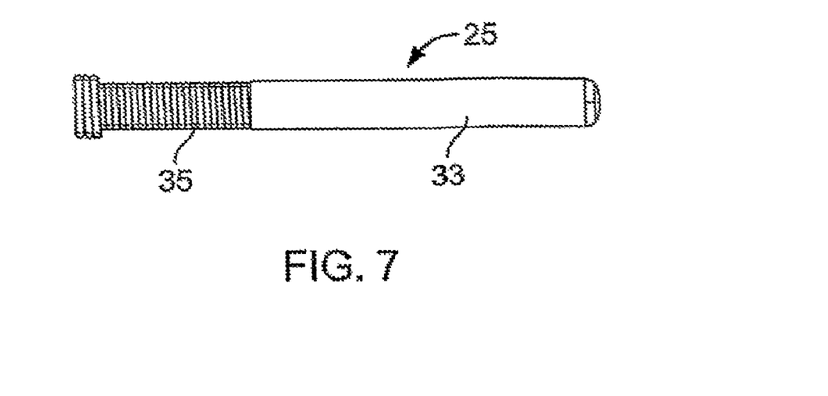
FIG. 7 is a side view of a spring mounted pin used in the skirt portion shown in FIGS. 3 and 4.

The pins, which may be made, for example, of brass, are mounted so that they can pivot freely with respect to the side legs 26. The pins may be of any desired length which will provide adequate light capture, for example about 2 to 4 cm long. In some implementations, the pins are spring-mounted on the side legs 26, e.g., the pins 25 may include a pin body 33 and a coil spring 35 disposed around an upper portion of the pin body, as shown in FIG. 7. The freedom of movement of the pins prevents the skirt from being damaged by movements of the workpiece; if the workpiece tips during processing, the pins can deflect out of the way without damage.

The height of the base of the pins relative to the workpiece should generally be readily adjustable. When the laser is in operation, to protect the operator the bases of the pins should generally be very close to the workpiece, e.g., a vertical distance of less than 5 mm, preferably 1 mm or less. To accomplish this, the array of pins is preferably capable of being adjusted upward to accommodate workpieces having different thicknesses or non-uniform thickness. In some implementations, this adjustment is provided by mounting the skirt of pins to travel vertically with the laser head. Thus, in the implementation shown in FIGS. 3 and 4, the U-shaped bracket 24 carrying the pins is mounted on a Z-axis plate 21 of the motion unit 13, so that the skirt of pins will move vertically with the laser cutting head 8.

However, in some processes the laser nozzle may be turned on when it is a significant vertical distance from the workpiece, in which case the operator could be exposed to reflected laser light if the bases of the pins were elevated at the level of the laser nozzle. Thus, in some implementations the skirt of pins is mounted so as to move vertically (in the z direction) independently of the laser cutting head. The skirt of pins still travels with the laser cutting head in the x-y plane.

Figure 8:
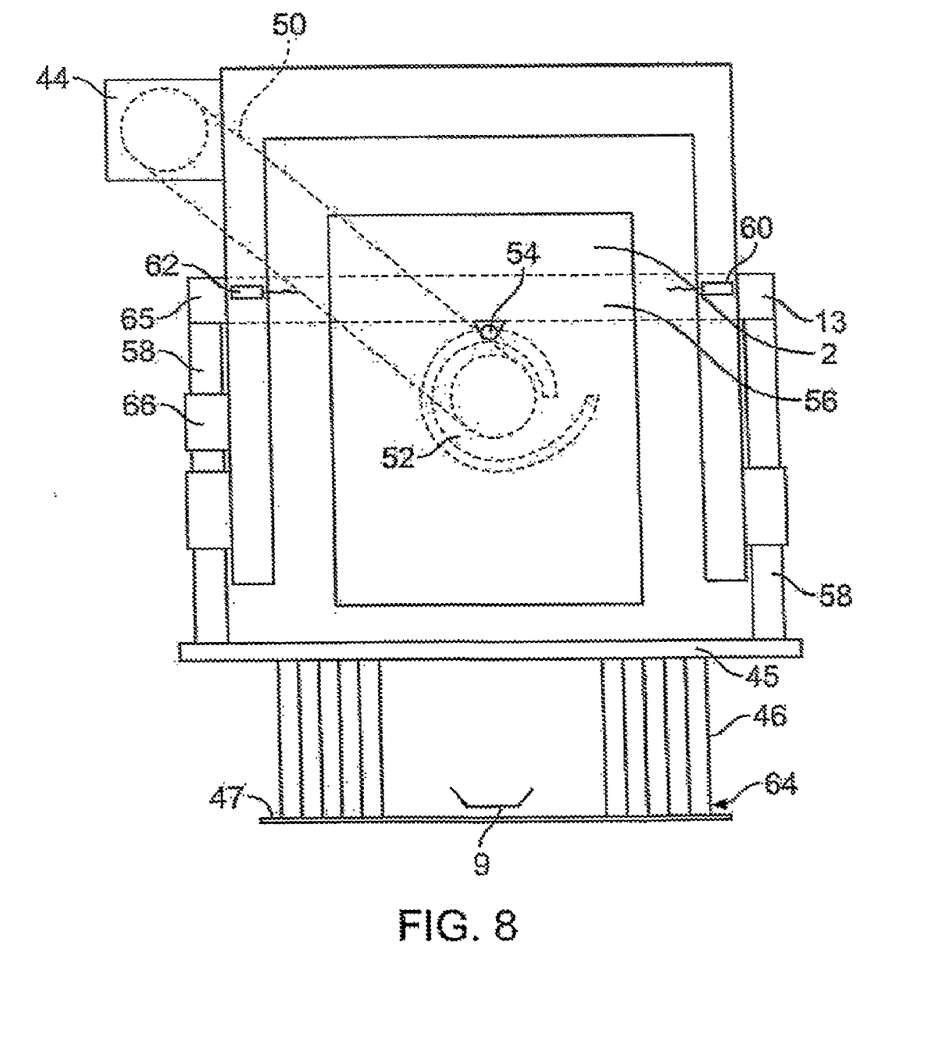
FIG. 8 is a front view of the skirt portion of a moving enclosure according to an alternative embodiment.

An example of an implementation in which the pins are mounted to move vertically independently of the laser cutting head is shown in FIG. 8. In this implementation, the pin bracket 45, carrying pins 46, is raised and lowered by a motor 44, e.g., a motor with a Profibus controller. The motor raises and lowers the pin bracket 45 through transmission belt 50 which rotates cam 52, which is connected to the pin bracket 45 via roller 54, brace 56 and guides 58. The cutting head 8, with nozzle 9, is mounted on a separate z-axis plate 2 which is movable independently of the pin bracket 45 by a z-axis drive (not shown).

When the bracket 45 and pins 46 are in an upper, reference position (e.g., 50 mm about the workpiece (z=0)), a reference switch 62 (in its ON position) indicates that the pin bracket 45 is in this upper position. Initially, the nozzle 9 is also in a raised position, e.g., at z=105 mm. The distance between the vertical positions (in the z direction) of the nozzle 9 and the pin bracket 45 is stored by the controller as a reference distance (RD).

When the cutting head is moved downward by the Z-axis plate 2, a switch 60 turns to the ON position. Switch 62 first turns OFF (cam 66 moves away.) The distance RD and the actual position of the Z-axis plate 2 are then used to calculate the distance that the pin bracket 45 must move in order to be sufficiently close to the workpiece 47. After this calculation has been made, the motor 44 lowers the pin bracket 45 until the bases 64 of pins 46 are very close to the workpiece 47, e.g., 1 to 2 mm from the workpiece. Switch 62 turns ON, activated by cam 65, and switch 60 turns ON, activated by cam 13. Two signals from switches 60 and 62 in a down position are needed for safety. Generally, in this position the bases 64 of the pins will also be about 1 mm above the bottom of nozzle 9 (unless the nozzle 9 is positioned unusually high above the workpiece during this first lowering step).

At this stage, in some implementations a height regulation feature is turned on. The height regulation feature includes one or more sensor(s) (not shown) that sense the z position of the top surface of workpiece 47, and send a signal to the z-axis drive causing the z-axis plate 2 to move as needed to maintain an appropriate distance between the cutting head and the workpiece during operation.

The height regulation feature may also be used to regulate the height of the pins, e.g., to accommodate differences in thickness of the workpiece, or tipping of the workpiece during cutting. This is accomplished by the sensors sending the same signal, indicating the position of the top surface of the workpiece, to the controller of the motor 44.

During the cutting operation, the nozzle 9 may be raised above the workpiece 47, for example up to 50 mm, for special cutting operations or for other reasons. Because the pin bracket 45 is controlled independently by motor 44, the pin bracket will stay in place immediately above the workpiece 47 to protect the operator. When the cutting operation is over, the motor 44 will return the pin bracket 45 to its raised, reference position, allowing the workpiece 47 to be easily removed.

Figure 9:
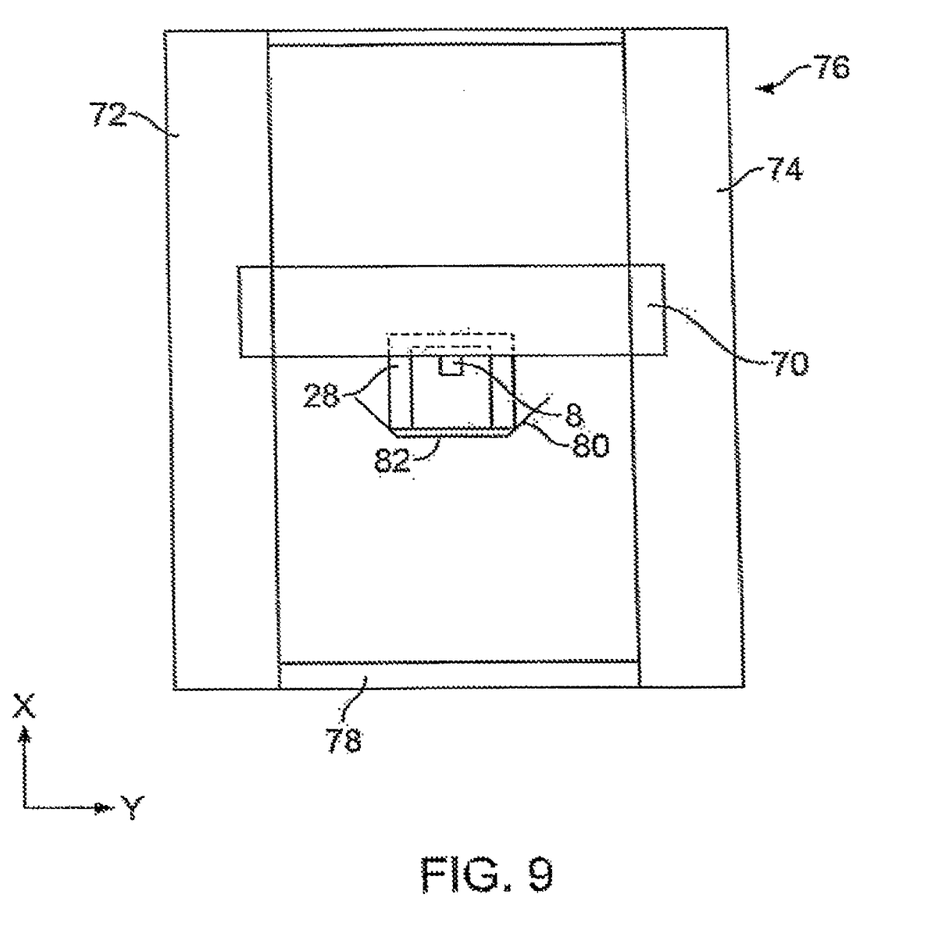
FIG. 9 is a top view of a moving enclosure according to an alternative implementation.

Referring now to FIG. 9, in some implementations the laser cutting head is mounted on a double supported motion unit (often referred to as a gantry mount), rather than being cantilevered out from a supporting surface 100 as shown in FIG. 1. When a gantry mount is used, a motion unit 70 is mounted on a pair of rails 72, 74, that define a machine frame 76. A brace 78 is positioned at the front of the machine frame 76, connecting rails 72, 74. In this case, the skirt 28 is mounted on the motion unit 70, and a protective front panel 80 is mounted directly to the laser cutting head 8 to protect the operator in the open front area of the skirt 28. The protective front panel includes a door 82, similar to door 12 discussed above with reference to FIG. 1. As discussed above, the skirt 28 may be mounted to move in the z direction with the cutting head 8, or may be controlled by a separate drive to move independently of the cutting head.

Other embodiments are within the scope of the following claims.

For example, if the skirt is extended so that its arms extend the full length of travel of the laser cutting head, the skirt need not travel with the laser cutting head in that direction (i.e., towards and away from the protective door.)

What is claimed is:

1. A machine tool installation comprising:
   a laser cutting head configured to be movable in at least two dimensions;
   a workpiece support configured to support a workpiece in operative relationship with the laser cutting head;
   a skirt configured to surround the laser cutting head on three sides and intercept light that passes from the head and is reflected off of the workpiece or workpiece support; and
   a protective cover positioned to intercept light that is reflected off of the workpiece or workpiece support and is not intercepted by the skirt;
   the skirt and protective cover being configured to move laterally with the laser cutting head.

2. The machine tool installation of claim 1 wherein the skirt is configured to move vertically with the cutting head.

3. The machine tool installation of claim 1 wherein the skirt is configured to move vertically independently of the cutting head.

4. The machine tool installation of claim 1 wherein the skirt is configured to move horizontally, in a second direction orthogonal to said lateral movement, with the laser cutting head.

5. The machine tool installation of claim 1 wherein the skirt comprises an array of pins mounted on a substantially U-shaped bracket.

6. The machine tool installation of claim 1 wherein the protective cover includes a door.

7. The machine tool installation of claim 1 wherein the protective cover defines open side and back regions.

8. The machine tool installation of claim 1 further comprising a motion device configured to move the protective cover and laser cutting head laterally.

9. The machine tool installation of claim 1 further comprising a support structure from which the protective cover and laser cutting head are cantilevered and along which the protective cover and laser cutting head move laterally.

10. The machine tool installation of claim 1 further comprising a controller configured to control the vertical height of the skirt, and a height regulation device comprising a sensor configured to detect the vertical position of the workpiece and transmit a signal to the controller.

11. The machine tool installation of claim 1 wherein the laser cutting head is configured to be movable in three dimensions.

12. The machine tool installation of claim 1 wherein the protective cover is mounted directly on the laser cutting head.

13. The machine tool installation of claim 3 further comprising a skirt drive motor and a cam arrangement configured to raise and lower the skirt in response to input from the skirt drive motor.

14. The machine tool installation of claim 4 wherein the skirt is configured to move within the protective cover, which is not configured for movement in the second direction.

15. The machine tool installation of claim 5 wherein the pins are arranged in a labyrinth, with their long axes extending generally parallel to the direction of light emitted by the laser cutting head.

16. The machine tool installation of claim 5 wherein the pins are spring-mounted.

17. The machine tool installation of claim 8 further comprising a pair of opposed rails between which the motion device is mounted and along which the motion device, protective cover and laser cutting head move laterally.

18. A moving enclosure for a machine tool installation including a laser cutting head configured to be movable in at least two dimensions, the enclosure comprising:
   a skirt configured to surround the laser cutting head on three sides;
   a z-axis motion control unit, on which the skirt is mounted, configured to position the skirt vertically relative to a workpiece to be machined; and a protective cover positioned to intercept reflected light from the laser cutting head that is not intercepted by the skirt;

the skirt and protective cover being configured to move laterally with the laser cutting head.

19. The moving enclosure of claim 18 wherein the skirt comprises an array of pins mounted on a substantially U-shaped bracket.

20. The moving enclosure of claim 18 wherein the skirt is configured to move independently of the cutting head.

21. The moving enclosure of claim 18 wherein the protective cover is mounted directly on the laser cutting head.

* * * * *